(12) United States Patent
Schulte et al.

(10) Patent No.: US 11,245,198 B2
(45) Date of Patent: Feb. 8, 2022

(54) RADAR ANTENNA AND SUITABLE METHOD FOR INFLUENCING THE RADIATION CHARACTERISTICS OF A RADAR ANTENNA

(71) Applicant: ASTYX GmbH, Ottobrunn (DE)

(72) Inventors: Benedikt Schulte, Munich (DE); Andre Giere, Oberpframmern (DE)

(73) Assignee: Astyx GmbH, Ottobrunn (DE)

( * ) Notice: Subject to any disclaimer, the term of this patent is extended or adjusted under 35 U.S.C. 154(b) by 0 days.

(21) Appl. No.: 15/532,261

(22) PCT Filed: Dec. 7, 2015

(86) PCT No.: PCT/EP2015/078853
§ 371 (c)(1),
(2) Date: Jun. 1, 2017

(87) PCT Pub. No.: WO2016/087676
PCT Pub. Date: Jun. 9, 2016

(65) Prior Publication Data
US 2017/0346192 A1      Nov. 30, 2017

(30) Foreign Application Priority Data
Dec. 5, 2014    (DE) .......................... 102014118036.4

(51) Int. Cl.
*H01Q 19/10*        (2006.01)
*H01Q 9/04*         (2006.01)
(Continued)

(52) U.S. Cl.
CPC ........... *H01Q 19/10* (2013.01); *H01Q 9/0407* (2013.01); *H01Q 15/148* (2013.01);
(Continued)

(58) Field of Classification Search
CPC .. H01Q 19/005; H01Q 19/10; G01S 13/0245; G01S 13/0263
See application file for complete search history.

(56) References Cited

U.S. PATENT DOCUMENTS 5,629,713 A * 5/1997 Mailandt ................. H01Q 1/246
                                                343/792.5
7,773,035 B2 * 8/2010 Murata .................... H01Q 3/24
                                                343/700 MS
(Continued)

FOREIGN PATENT DOCUMENTS

CN         1256819         6/2000
CN       101032054        11/2011
(Continued)

OTHER PUBLICATIONS

International Search Report for Corresponding International Patent Application No. PCT/EP2015.078853 dated Apr. 12, 2016 (with translation) 4 pages.
(Continued)

*Primary Examiner* — Andrea Lindgren Baltzell
*Assistant Examiner* — Amal Patel
(74) *Attorney, Agent, or Firm* — Medley, Behrens & Lewis, LLC

(57) ABSTRACT

A radar antenna includes parasitic elements for influencing the radiation characteristics of the radar antenna, the radiation characteristics of the radar antenna being dependent upon the spatial position of the parasitic elements relative to the radar antenna and phase positions ($\varphi 1$, $\varphi 2$, $\varphi 3$) of energies radiated off the radar antenna and the parasitic elements. The radar antenna is designed using microstrip technology.

14 Claims, 2 Drawing Sheets

(51) Int. Cl.
   *H01Q 21/08* (2006.01)
   *H01Q 15/14* (2006.01)
   *H01Q 19/00* (2006.01)
   *G01S 13/02* (2006.01)
   *H01Q 1/42* (2006.01)
   *H01Q 21/06* (2006.01)

(52) U.S. Cl.
   CPC ........... *H01Q 19/005* (2013.01); *H01Q 21/08* (2013.01); *G01S 2013/0245* (2013.01); *H01Q 1/42* (2013.01); *H01Q 21/061* (2013.01)

(56) References Cited

U.S. PATENT DOCUMENTS

| | | | | |
|---|---|---|---|---|
| 8,184,064 | B2 * | 5/2012 | Sanford | H01Q 1/42 343/872 |
| 8,626,242 | B2 * | 1/2014 | Ono | H01Q 9/0414 455/562.1 |
| 2010/0141517 | A1 | 6/2010 | Surittikul et al. | |
| 2014/0266957 | A1 * | 9/2014 | Inoue | H01Q 21/08 343/843 |
| 2015/0333413 | A1 * | 11/2015 | Piazza | H01Q 3/24 342/374 |

FOREIGN PATENT DOCUMENTS

| | | |
|---|---|---|
| CN | 102341958 | 2/2012 |
| CN | 202276339 | 6/2012 |
| DE | 6902510 | 5/1969 |
| DE | 69702510 | 3/2001 |
| DE | 102006041982 | 3/2008 |
| EP | 1 804 335 | 7/2007 |
| JP | H09-246852 | 9/1997 |
| JP | 2001-111335 | 4/2001 |
| JP | 2003-198247 | 7/2003 |
| JP | 2006-135595 | 5/2006 |
| JP | 2007-037077 | 2/2007 |
| JP | 2007325303 | 12/2007 |
| JP | 2009-130451 | 6/2009 |
| JP | 2009-200790 | 9/2009 |
| JP | 2009-246460 | 10/2009 |
| JP | 2013/168875 | 8/2013 |
| WO | WO-2008028739 A1 * | 3/2008 ........... H01Q 19/005 |
| WO | 2014/119141 | 8/2014 |
| WO | WO2014/119141 | 8/2014 |

OTHER PUBLICATIONS

CN Office Action in Chinese Appln. No. 201580066071.4, dated Nov. 26, 2019, 22 pages (with English Translation).
DE Search Report in German Appln. No. 102014118036.4, dated May 20, 2015, 9 pages (with English Translation).
International Preliminary Report on Patentability in International Appln. No. PCT/EP2015.078853, dated Jun. 6, 2017, 15 pages (with English Translation).
Lee, "Radiation of Characteristics of microstrip arrays with parasitic elements," Electronic Letters, 23:16,835-837.
CN Office Action in Chinese Appln. No. 201580066071.4, dated Mar. 7, 2019, 23 pages (with English Translation).
JP Office Action in Japanese Appln. No. 2017528474, dated May 21, 2019, 8 pages (with English Translation).
CN Office Action in Chinese Appln. No. 201580066071.4, dated Jun. 15, 2020, 15 pages (with English Translation).
CN Search Report in Chinese Appln. No. 201580066071.4, dated Jun. 7, 2020, 1 page.
EP Office Action in European Appn. No. 15820821.5, dated Nov. 9, 2020, 18 pages (with English Translation).
"Response to the Fourth Office Action for Chinese Patent Application No. 201580066071.4", Filed Date: Jul. 6, 2021, 10 Pages.
"Decision on Opposition for Japanese Patent No. 6600686", Mailed Date: Jun. 25, 2021, 42 pages.
JP Official Notification of Reason for Revocation in Japanese Appln. No. 2017-528474, dated Nov. 20, 2020, 17 pages (with English Translation).
"Request for Correction and Written Opinion for Japanese Patent Application No. 2017-528474", Filed Date: Feb. 17, 2021, 33 Pages.
"Reply to Office Action for European Patent Application No. 15820821.5", Filed Date: Mar. 15, 2021, 9 Pages.
"Decision on Rejection for Chinese Patent Application No. 201580066071.4", dated Sep. 8, 2021, 21 Pages.

* cited by examiner

RADAR ANTENNA AND SUITABLE METHOD FOR INFLUENCING THE RADIATION CHARACTERISTICS OF A RADAR ANTENNA

FIELD OF THE INVENTION

The present invention relates to a radar antenna and to a suitable method for influencing the radiation characteristics of a radar antenna.

BACKGROUND

It is generally known that the radiation characteristics of a radar antenna are basically spherical, and separate directing elements should not influence the radiation characteristics. However, the radiation characteristics are primarily spherical, even when guiding elements are used, the illumination of which, possibly in peripheral regions, is insufficient.

SUMMARY

It is therefore the object of the present invention to further develop a radar antenna and a suitable method in this regard which avoids the disadvantages specified above. Furthermore, it is the object of the present invention to improve or to influence the radiation characteristics of a radar antenna.

If, according to the application, the radiation characteristics of the antenna are made dependent on the spatial position of the parasitic elements relative to the antenna and on the phase position of energies radiated off the antenna and the parasitic elements, by means of the parasitic elements improved radiation characteristics can be brought about which in particular generate a signal effect in inaccessible peripheral regions.

When using radar antennas in microstrip technology it is possible to develop and construct the apparatus according to the application preferably in minimalised form. With microstrip technology it is therefore possible, taking into account the physical factors, to make available radiation characteristics in radar antennas which can be influenced by the parasitic elements.

Further advantageous configurations of the present invention are the subject matter of the sub-claims.

With the arrangement of the parasitic elements, on the one hand broadening, but also focusing of the radiation characteristics of the radar antenna may be brought about, primarily in the azimuthal direction. The improved radiation characteristics can advantageously also be used in one or also in a number of antenna lines, predominantly using microstrip line technology. Nevertheless, it has proven to be an advantage to also configure the parasitic elements comprising one or a number of antenna lines using microstrip line technology.

It has also proven to be advantageous if the parasitic elements change the radiation characteristics of the antenna to be influenced by mutual coupling to one another and/or by mutual coupling with said antenna. In this way the desired radiation characteristics can be brought about easily and can be aligned depending on the application profile. If the parasitic elements are arranged parallel to the longitudinal axis of the radar antenna to be influenced, there will be more optimal radiation characteristics.

If the parasitic elements at the base point of the antenna have a defined termination, preferred influencing of the radiation characteristics of the radar antenna is made possible and implemented.

If the radar antenna and/or the parasitic elements are covered with a radome, by using the geometric form of the radome, the radiation characteristics of the radar antennas can also be influenced, and in particular coupling, as described for example in claim 6, can additionally be brought about. The radiation characteristics of the radar antenna in addition to the parasitic elements are therefore also influenced by the radome or the peripheral zone or peripheral regions are reached depending on the circumstances.

It has proven to be advantageous if the radar antenna is used with parasitic elements in the frequency range between 1 MHz and 200 GHz, preferably in the frequency range between 20 GHz and 100 GHz. This frequency range is effectively implemented, in particular in interaction with the microstrip line. A use of the antenna with parasitic elements that must be particularly highlighted is in the frequency range between 70 and 80 GHz. It has also proven to be advantageous if the antenna comprising a transmitter and receiver or combined transmitter/receiver radar antenna is used. With the radar system according to the application it has been shown that influencing and aligning the radiation characteristics is an advantageous area of application when used for determining the position or speed of objects.

Further advantageous configurations of the present invention are the subject matter of the other sub-claims.

BRIEF DESCRIPTION OF THE DRAWINGS

An advantageous configuration of the present invention is shown with reference to the following drawings.

DETAILED DESCRIPTION

Figure 1:
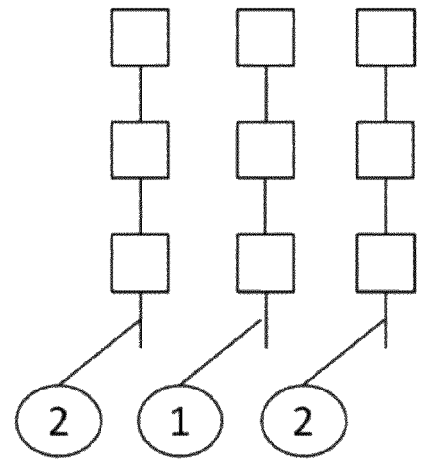
FIG. 1 shows a radar antenna system according to the application using microstrip line technology.

In FIG. 1, 1 represents the antenna line to be influenced using microstrip technology which preferably has parasitic elements 2 arranged in parallel and which are also shown as antenna lines using microstrip technology.

Figure 2:
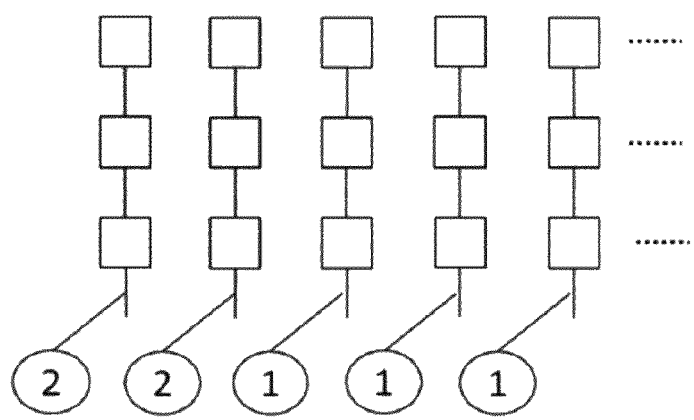
FIG. 2 shows a radar antenna system according to the application with a number of antenna lines using microstrip line technology.

Another advantageous configuration consists in using a number of antenna lines to be influenced using microstrip line technology according to FIG. 2 and which are influenced by parasitic elements 2, the parasitic elements 2 being arranged doubly in parallel as antenna lines using microstrip technology. At this point it should be stressed that depending on the number of parasitic elements arranged in parallel, the radiation characteristics can be influenced accordingly for the radar antenna system according to the application.

Figure 3:
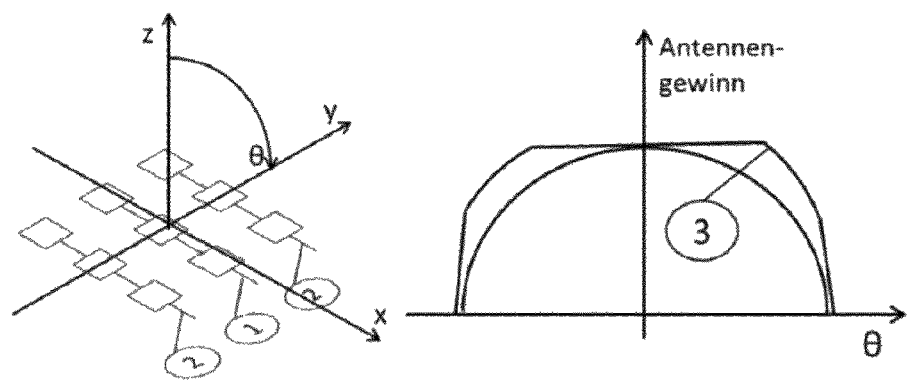
FIG. 3 shows the radiation characteristics according to the radar antenna system according to the application.

In FIG. 3 the radar antenna system according to the application of FIG. 1 is shown, illustrating to what extent the radiation characteristics of the influenced radar antenna 1 can bring about improved illumination, in particular in the peripheral zone region. In FIG. 3 the radiation characteristics corresponding to the azimuth angle $\Theta$ are also reproduced, and this reflects broadened radiation characteristics with a corresponding antenna gain 3.

Figure 4:
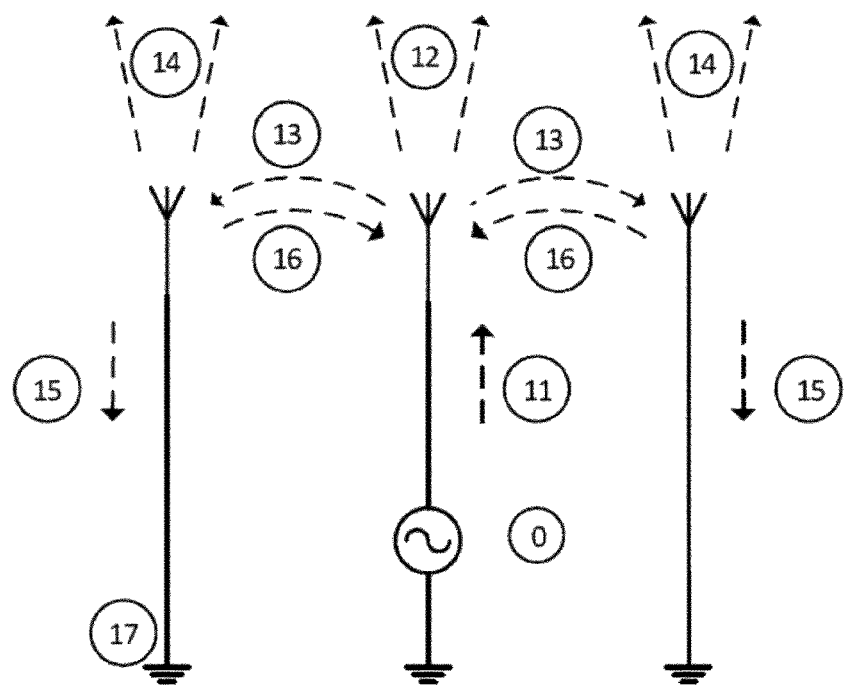
FIG. 4 shows energy distribution within the radar antenna system according to the application.

In FIG. 4 the qualitative description of the influence of the radiation characteristics by the mutual coupling between a transmitting antenna and two parasitic elements according to the illustration of FIG. 1 is reproduced. Energy from the signal source 0 is propagated to the radar antenna acting as the transmitting antenna. Energy is then radiated from the transmitting antenna into the space. Some of the energy strikes the parasitic elements. Some of the energy is reflected by the parasitic elements and is radiated into the space. The energy radiated off has a phase position φ1. The parasitic elements receive energy which is radiated from the transmitting antenna to the parasitic antennas according to 13. With 14 the process is described during which the energy is reflected by the parasitic elements 2 and is radiated from the radar antenna into the space. The energy has the phase position φ2. 15 designates the energy which is received by the parasitic elements. The energy that is reflected by the parasitic elements 2 to the transmitting antenna 1 is designated as 16. Thus, the radiation characteristics of the transmitting antenna 1 are influenced by the energy of the parasitic elements that is radiated off. Overlaying of the radiated off energy of the transmitting antenna 1 with the radiated off energy of the parasitic elements 2 takes place. The parasitic elements have a defined termination at the base point of the antenna as a short-circuited line end 17. Whether the radiation characteristics are broadened or focused is dependent upon the spatial positioning of the respective transmitting antennas and parasitic antennas and the corresponding phase position φ1, φ2 etc.

In this way in particular a radar antenna system is provided which can broaden the radiation characteristics depending on the requirements and in particular can be used advantageously when using microstrip line technologies.

The invention claim is:

1. A radar antenna, comprising:
   a transmitting or receiving antenna comprising three or more microstrip antenna lines, each microstrip antenna line of the transmitting or receiving antenna comprising a plurality of electrically-connected patches arranged in a line extending in a first direction;
   a pair of parasitic elements each comprising a microstrip antenna line, each microstrip antenna line of the parasitic elements comprising a plurality of electrically-coupled patches arranged in a line extending in the first direction; and
   wherein the parasitic elements are configured to influence radiation characteristics of the radar antenna, the radiation characteristics of the radar antenna being dependent upon the spatial position of the parasitic elements relative to the transmitting or receiving antenna and phase positions of energies radiated off the transmitting or receiving antenna and the parasitic elements,
   wherein the microstrip antenna lines of the parasitic elements are arranged adjacent and parallel to one another and the microstrip antenna lines of the transmitting or receiving antenna are arranged adjacent and parallel to one another, wherein a first microstrip antenna line of the transmitting or receiving antenna and a second microstrip antenna line of the transmitting or receiving antenna are arranged on opposing sides of a third microstrip antenna line of the transmitting or receiving antenna, wherein the microstrip antenna lines of the parasitic elements are arranged on a side of the first microstrip antenna line of the transmitting or receiving antenna that is opposite the side facing the third microstrip antenna line of the transmitting or receiving antenna.

2. The radar antenna of claim 1, wherein the arrangement of the parasitic elements relative to the transmitting or receiving antenna results in broadening of the radiation characteristics of the radar antenna in an azimuthal direction.

3. The radar antenna of claim 1, wherein by mutual coupling between the parasitic elements and/or by mutual coupling between the parasitic elements and the transmitting or receiving antenna, the parasitic elements change the radiation characteristics of the radar antenna by broadening the radiation characteristics in an azimuthal direction.

4. The radar antenna of claim 1, wherein the first direction corresponds to a longitudinal axis of the radar antenna to be influenced.

5. The radar antenna of claim 1, wherein the microstrip antenna lines of the parasitic elements terminate at a base point of the radar antenna in the first direction.

6. The radar antenna of claim 1, wherein the use of the radar antenna is configured to operate in a frequency range between 1 MHz and 200 GHz.

7. The radar antenna of claim 1, wherein the radar antenna is configured to operate in a frequency range between 70 and 80 GHz.

8. The radar antenna of claim 1, wherein the radar antenna is configured to be used as a transmitter, receiver, or combined transceiver antenna.

9. The radar antenna of claim 1, the radar antenna is part of a radar system for determining the position and/or speed of objects.

10. A radar system comprising:
    the radar antenna according to claim 1.

11. A method for influencing the radiation characteristics of a radar antenna using a pair of parasitic elements, the method comprising:
    a) propagating energy from a signal source to a transmitting antenna;
    b) radiating the energy from the transmitting antenna into a space, the radiated energy having a phase position cp1, wherein some of the energy radiated from the transmitting antenna strikes the parasitic elements;
    c) reflecting some of the energy striking the parasitic elements from the parasitic elements and radiating some of the energy reflected from the parasitic elements into the space, the radiated energy reflected from the parasitic elements having a phase position cp2;
    d) receiving, by the parasitic elements, some of the energy radiated by the transmitting antenna striking the parasitic elements; and
    e) reflecting some of the energy from the parasitic elements back to the transmitting antenna;
    wherein the transmitting antenna comprises three or more microstrip antenna lines each microstrip antenna line of the transmitting antenna comprises a plurality of electrically-connected patches arranged along a line extending in a first direction and each of the parasitic elements comprise a microstrip antenna line where each microstrip antenna line of the parasitic elements comprises a plurality of electrically-coupled patches arranged in a line extending in the first direction and the microstrip antenna lines are arranged adjacent and parallel to one another and the microstrip antenna lines of the transmitting antenna are arranged adjacent and parallel to one another, wherein a first microstrip antenna line of the transmitting or receiving antenna and a second microstrip antenna line of the transmitting or receiving antenna are arranged on opposing sides of a third microstrip antenna line of the transmitting or receiving antenna, wherein the microstrip antenna lines of the parasitic elements are arranged on a side of the first microstrip antenna line of the transmitting or receiving antenna that is opposite the side facing the third microstrip antenna line of the transmitting or receiving antenna, the radiation characteristics of the transmitting antenna being influenced by the energy radiated from the parasitic elements.

12. The radar antenna of claim 1, wherein the parasitic elements comprise a short-circuited line end.

13. The radar antenna of claim 1, wherein the arrangement of the parasitic elements relative to the transmitting or receiving antenna results in focusing of the radiation characteristics of the radar antenna in an azimuthal direction.

14. The method of claim 11, wherein the arrangement of the parasitic elements relative to the transmitting or receiving antenna results in focusing of the radiation characteristics of the radar antenna in an azimuthal direction.

* * * * *